(12) United States Patent
Shmidt et al.

(10) Patent No.: US 10,046,986 B2
(45) Date of Patent: Aug. 14, 2018

(54) COMPOSITE MATERIAL

(75) Inventors: Joseph Lvovich Shmidt, New York, NY (US); Gleb Dmitrievich Rusinov, St. Petersburg (RU); Alexander Ivanovich Andreev, St. Petersburg (RU); Alexander Gennadievich Mitilineos, St. Petersburg (RU); Denis Vladislavovich Baigozin, St. Petersburg (RU)

(73) Assignee: Electrophor, Inc., Woodmere, NY (US)

( * ) Notice: Subject to any disclaimer, the term of this patent is extended or adjusted under 35 U.S.C. 154(b) by 304 days.

(21) Appl. No.: 13/519,129

(22) PCT Filed: Dec. 21, 2010

(86) PCT No.: PCT/RU2010/000776
§ 371 (c)(1),
(2), (4) Date: Jun. 25, 2012

(87) PCT Pub. No.: WO2011/078745
PCT Pub. Date: Jun. 30, 2011

(65) Prior Publication Data
US 2012/0305474 A1 Dec. 6, 2012

(30) Foreign Application Priority Data
Dec. 25, 2009 (RU) .................. 2009148567

(51) Int. Cl.
*B23B 3/26* (2006.01)
*C02F 1/28* (2006.01)
*B01J 20/26* (2006.01)
*B01J 20/28* (2006.01)
*B01J 39/20* (2006.01)
*B01J 20/04* (2006.01)
*B01J 20/06* (2006.01)
*B01J 20/10* (2006.01)
*B01J 20/20* (2006.01)
*B01D 39/16* (2006.01)
*B01J 47/018* (2017.01)
*C02F 1/00* (2006.01)

(52) U.S. Cl.
CPC .......... *C02F 1/288* (2013.01); *B01D 39/1607* (2013.01); *B01J 20/043* (2013.01); *B01J 20/06* (2013.01); *B01J 20/10* (2013.01); *B01J 20/20* (2013.01); *B01J 20/261* (2013.01); *B01J 20/262* (2013.01); *B01J 20/28023* (2013.01); *B01J 20/28028* (2013.01); *B01J 39/20* (2013.01); *B01J 47/018* (2017.01); *B01D 2239/0407* (2013.01)

(58) Field of Classification Search
None
See application file for complete search history.

(56) References Cited

U.S. PATENT DOCUMENTS

| 6,299,771 B1 * | 10/2001 | Shmidt et al. ............... 210/263 |
| 2004/0232068 A1 | 11/2004 | Johnston et al. |
| 2010/0187171 A1 * | 7/2010 | Gupta .................... D04H 1/42 210/491 |

FOREIGN PATENT DOCUMENTS

RU 2132729 C1 7/1999

* cited by examiner

*Primary Examiner* — Allison G Fitzsimmons
(74) *Attorney, Agent, or Firm* — Hoffmann & Baron, LLP

(57) ABSTRACT

The invention relates to composite materials, and more particular to composite adsorptive materials for purification of liquids, in particular, a drinking water, on the basis of components of a granulated material and a fibrous material. The new composite material for filtering purifying a liquid on the basis of a mixture of components of granulated and fibrous materials comprises volume zones with adjustable density, which zones create the structure of the material, which structure is self-strengthened when a liquid flows in the course of filtration, wherein, said volume zones make the material most part, each zone is created in the form of a interlaced fiber site, which sites are bonded among themselves by separate fibers, and the space within and between said interlaced fiber sites is filled with a granulated material.

17 Claims, No Drawings

COMPOSITE MATERIAL

FIELD OF THE INVENTION

The present invention relates, in general, to composite materials, and, in particular, to composite adsorptive materials for purification of liquids, in particular, potable water, based on moulding granulates and fibrous material components.

BACKGROUND OF THE INVENTION

Potable water in many cases requires additional purification (afterpurification) in area of consumption, since traditional water-treatment system constructions do not always allow to remove or reduce concentration of individual contaminants up to standardized amounts, which in final result affects quality of potable water.

Generally, an afterpurification system for additional purification of potable water includes a column of activated carbon used to remove chlorine, organic chemicals, and other contaminants. In many cases, activated carbon of granular form is used. Advantages of use of filters with granular activated carbon are that granular activated carbon is a cheap raw material, has rather small hydraulic resistance, and does not consolidate when liquid flows. A disadvantage is low rate of adsorption. Therefore, with use of granular activated carbon in the industry, the recommended time of contact of a sorbent in the column and a liquid is not less than 15 minutes, which amount of time is unacceptable for ordinary living conditions. Besides, a column with granular activated carbon does not remove fine contaminant particles because of relatively large size of the sorbent granules and the free space (voids) between them.

Powdery activated carbon, as it is known, adsorbs impurities faster than granular activated carbon does, however, use of smaller fraction creates high hydraulic resistance and results in undesirable compaction of a filtration column when a liquid flows. To avoid compaction, a binder is usually injected. Filtering elements comprising particles of activated carbon, aggregated in a hard structure by polymeric binder in the form of a thermoplastic material, do not consolidate when a liquid flows. However, in this case, a part of adsorption volume of activated carbon is not used in operation because of contact with an immobilizing binder. In those filters, activated carbon particles occupy only a part of adsorptive column volume, while at the same time another part of the adsorptive column volume is occupied by the binder. The binder is not active to adsorb contaminants, and its introduction results in increasing a column size in comparison with an adsorptive column, which comprises only activated carbon. Besides, manufacturing such filtering elements is expensive and requires exact temperature regimes, and other high-precision controlled process parameters.

Methods of using activated carbon fibers in columns is known, but those methods are rather expensive and cause compaction of the fibers when liquid flows, which results in increased flow resistance, although the fiber compaction is significantly smaller than using powdery activated carbon.

In the prior art, it is known to use filtering elements for liquid purification on the basis of a mixture of granulated material and fibrous material. For example, there is known a composite material consisting of an adsorbing granulated material and a material capable of extending when it contacts with a liquid (U.S. patent application No 20040232068 A1, published on 25 Nov. 2004, IPC B01D 039/100). An adsorbing material can be, for example, a granulated activated carbon (80-325 mesh) and granulated ion-exchange resin, and a polymer extending material can be, for example, ion-exchange fibers based on a polyacrylonitrile. Components of the materials are carefully mixed and located in a suitable case, which case volume limits swelling value of the extending material. Formation of a porous composite material occurs at its contact with a liquid in the this case due to immobilizing the granulated material in an extending material in the course of its swelling, and also due to pressure of internal walls of the case, forming a structure with random distribution of original components that are strongly enough kept together, while at the same time the composite material is capable of taking the case shape. The extending material can be at quantities from 0.1% to 99.9% by weight.

Disadvantages of the described porous composite material consist in that, at stage of obtaining it, namely, at immobilizing granular particles into an extending material, it is impossible to form a substantively ordered porous structure. Besides, in intervals between filtrations, in course of dehydration of an extending material, the granular component can be undesirably moved, and, as a consequence, gradual destruction of the composite porous filtration structure can occur.

Another example of use of a composite material for liquid purification, in particular, for potable water, based on a mixture of granular and fibrous materials, is described in Russian Federation patent No 22132729, published on 10 Jul. 1999, IPC B01D 039/02, and U.S. Pat. No. 6,299,771, published on 9 Nov. 2001, IPC B01D 039/00.

Russian Federation patent No 2132729 discloses the composite adsorptive material comprising a packed mixture of granules and fibers in the form of granular activated carbon in the amount of 5-30% by weight and activated carbon fibers in the amount of 70-95% by weight. The mixture also can be consisted of ion-exchange granules and ion-exchange fibers. In the composite adsorptive material, the fibers closely fill the space between activated carbon granules. Sizes and relative amounts of granules and fibers are selected so that the filtering element filters water of contaminants faster than traditional filters with granules of activated carbon. At significant time periods between filtrations, the packed mixture of granules and fibers indicates improved characteristics and recovery of adsorptive capabilities during intervals between filtrations.

A filter described in U.S. Pat. No. 6,299,771 consists of a compacted mixture of components: granulated activated carbon in the amount of 5-30% by weight and the activated carbon fibers in the amount of 70-80% by weight. The mixture of ion-exchange granules with ion-exchange fibers also can be used in the filter. As granules, particles with the size of 50-3000 μm, preferable 100-2000 μm are used. The length of fibers is 0.2-20 mm, preferably 1-10 mm, and the average diameter is 1-30 μm, more preferably 4-20 μm. Average diameter of granules is to be more than average diameter of the fiber. At the same time, fibers are intertwisted among themselves in the composite structure and around closely packed granules of activated carbon adjoining with each other, and with high grade of filling voids between the granules. As a result, numerous channels for water passage are formed, at the expense of which the filtering element hydraulic resistance is reduced. The described composite material is capable of restoring adsorption properties (prototype) in the intervals between the filtrations.

Aforesaid examples of filtering elements made on the basis of composite have a number of disadvantages. As disclosed in Russian Federation patent No 2132729 and in U.S. patent of the U.S. Pat. No. 6,299,771, the fibers of composite material structure do not provide sufficient fixation of small fractions of the granular component, and undesirable compaction of the composite material can occur in the course of water flowing through the filtering element, resulting in increased filtration time and reduced filtration rate of the filtering element, and also damage of composite material structure because of capturing and moving poorly fixed granular particles by a water stream, particularly powdery particles, including their agglomeration, which will result in low efficiency of liquid purification during the life of the claimed filtering element.

SUMMARY OF THE INVENTION

An object of the present invention is creation of a new composite material that avoids the above-mentioned disadvantages.

The technical effect achieved with utilization of the present invention is reducing liquid filtration time by increasing filtration rate with increase in liquid purification efficiency of ions of lead and chloroform, and preserving the composite material structure.

The object and needed technical effect are achieved by creating a new composite material for a liquid purification based on the mixture of components of granulated and fibrous materials, the composite material comprising volume zones with adjustable density, the volume zones forming a structure of the composite material that is self-strengthening when a liquid flows in the course of filtration, wherein the volume zones form a substantial part of the composite material, each zone being in the form of a site with interlaced fibers, wherein the interlaced fiber sites are connected among themselves by individual fibers and the space within and between interlaced fiber sites is filled with granular material. At the same time, the size of the interlaced fiber sites is longer than average length of an individual fiber and is not less than 1 mm. If the size of a interlaced fiber site is preferably 5 mm-8 mm, then the average length of an individual fiber is 0.5 mm-3.9 mm, preferably 2.5 mm-3.5 mm, and if the size of each interlaced fiber site is 9 mm-16 mm, then the average length of an individual fiber is 4 mm-15.5 mm, preferably 7 mm-8 mm. The granulated material can be granulated activated carbon, powdered activated carbon, granulated ion-exchange resin, granulated inorganic adsorbents made on a basis of oxide, carbonates and silicates, or any of their combinations. The fibrous material uses polymer fibers with surface energy not less than 30 mJ/m$^2$, preferably not less than 60 mJ/m$^2$. The polymer fibers are fibers based on polyacrylonitrile, cellulose fibers, modified fibers on the basis of cellulose polyamide fibers, polyester fibers, carbon fibers, silicon comprising fibers, or any of their combinations, while at the same time the polymer fibers on the basis of polyacrylonitrile use ion-exchange fibers possessing cation-exchange, anion-exchange, ion-complexing characteristics, or any combination of the these properties.

According to the invention, volume zones with regulated density are created in a composite material using a granulated material and fibrous material characterized by certain surface energy and average individual fiber length, by physical and chemical interactions between fibers according to the prescribed method. Energy of interaction between fibers in volume zones depends on their surface energy. Fibers shall have a surface energy not less than 30 mJ/m$^2$, preferably not less than 60 mJ/m$^2$. The more surface energy fibers have, the more points of physical and chemical interaction will be formed in volume zones, and therefore the density of the fibers will be greater. As physical and chemical interaction between fibers is carried out according to mechanism of mutual hydrophilous-hydrophilous attraction by water medium, then using fibers with surface energy <30 mJ/m$^2$, the fibers will cooperate with water and with each other at insufficient degree to form volume zones with low density. Thus, the surface energy of fibers defines density of volume zones. Regulation of density of the volume zones can change the filtration rate: filtration rate can increase, and filtration time will decrease accordingly.

According to the invention, each volume zone is in the form of a site having interlaced fibers (interlaced fiber site), and granulated material is distributed within the interlaced fibers sites, and to a lesser degree between them. Interlaced fibers sites keep granulated material distributed in the composite structure and do not allow granules to be moved and condensed, while at the same time individual fibers of the composite structure are interlaced around the interlaced fiber sites in a total volume of the composite material, forming a uniform (bonded) structural matrix. The size of plurality of interlaced fibers sites shall be greater than average length of an individual fiber. Individual fibers form structural zones with less density. Due to less density of structural zones, interlaced fibers sites are capable of moving in relation of each other under the action of external mechanical forces, while at the same time there is no stratification of the composite material, i.e., the composite material is free-running in a dry state before a liquid filtration that allows to stuff or fill easily any desired filter column or unit with the necessary quantity of the composite material. During filtration, the liquid moves both inside and around interlaced fibers sites. Interlaced fibers sites provide reduced flow resistance, which increases the liquid filtration rate.

The size of each interlaced fiber site, according to the invention, is not less than 1 mm. If the average length of an individual fiber is from 0.5 mm to 3.9 mm, preferably 3 mm-3.5 mm, then the size of each interlaced fiber site is preferably 5 mm-8 mm. If the average length of an individual fiber is from 4 mm to 15.5 mm, preferable 7 mm-8 mm, then the size of each interlaced fiber site is preferably 9 mm-16 mm. With use of fibers having average length more than 15.5 mm, the fibers begin to cooperate intensely with themselves forming loops and knots that interfere with forming the composite material structure, most of which is comprised by volume zones.

More specifically, the interlaced fibers sites are connected one with other by physical and/or physical and chemical interaction of individual fibers. Physical interaction is carried out by mechanical coupling of fibers with each other. Physical and chemical interaction begins to appear at contact of a fiber with water. In the course of liquid flowing, the number of points of physical and chemical interactions increases. The more points of interconnections, the greater the density of volume zones. By increasing the density of the volume zones, the ability of volume zones to hold granulated material increases. Physical interactions also arise at points under the action of a liquid stream being filtered. There is an additional mechanical coupling of fibers with each other in such a way that when filtration ends and after the composite material dries, the composite material is not shrunken, compacted, or its structure destructed. Due to strengthening the structure of the composite material, the composite material is capable of taking the shape of any case in which it is housed, while at the same time the composite material can be easily taken out from the case as a one piece integrated element without being scattered. By "self-strengthening" in the course of liquid flowing, the composite material keeps its structure throughout the life of the claimed filtering element.

In the prior art, there is known use of powdered particles of granulated material. It is known that filter materials made of small-fraction carbon adsorb contaminants better than filter materials on the basis of coarse-fraction activated carbon because the adsorbing surface area of the powdered particles is greater. However, usually, at various stages of obtaining a filter material, with agitation, powdered-fraction particles easily link with each other and easily fill free spaces, which would also include free spaces between the particles of granulated activated carbon if granulated activated carbon is used. The foregoing results in formation of large agglomerates of small-fraction particles and excessive compaction of the filtering structure, which substantially increases flow resistance of the filtering element and reduces efficiency of purification. According to the invention, small fraction-particles are distributed within interlaced fiber sites, and to a lesser degree between them. Because the composite material has a more dense structure, the interlaced fibers sites hold powdered particles and do not allow them to be moved and agglomerated. This allows the composite material to use more powdered component in proportion to other components of the composite material, which in total allows the composite material to reach efficiency of removing lead ions and chloroform from a liquid.

The composite material according to the invention represents a mixture of granulated material and a fibrous material.

As a granulated material, there can be used, for example, granulated activated carbon, powdered activated carbon (produced by Davao Chemical, Philippines; or Bieco-link Carbons (PTE) LTD., Sri Lanka), granulated ion-exchange resin (C243, produced by Sybron Chemicals Inc., USA), granulated inorganic adsorbents on the basis of oxides ("HromLab" LTD., Russia, 0.05 mm-0.1 mm), carbonates ("Kamnizdes" LTD., Russia, dolomite 0.1-1 mm), and silicates (VOSTOK-ENERGO JSC., Russia, 0.1-0.9 mm), or any of their combinations.

As a fibrous material, there can be used, for example, cellulose fibers ("Polymarct" Ltd., Russia, with the surface energy 34 mJ/m$^2$), modified fibers on the basis of cellulose ("DKM Venture projects" Ltd., Russia, 43 mJ/m$^2$), polyamide fibers, polyester fibers (Don PolymerMarket JSC, Russia, 31 mJ/m$^2$), carbon fibers (KoTHmex, Taiwan, 47 mJ/m$^2$), siliceous fibers (Dowex, USA, 36 mJ/m$^2$), polymer fibers on the basis of polyacrylonitrile, or any of their combinations. As polymer fibers on the basis of polyacrylonitrile, there are used fibers with cation-exchange, anion-exchange, ion-complexing properties, or any combination of these properties (for example, fibers Copan produced by "TES" Research and Production Company, Russia, 70 mJ/m$^2$).

The composite material, for example, can be obtained according the following method including two stages.

At the first stage, a previously cut fiber of certain length, according to the invention, is exposed to preliminary conditioning (preconditioning). The fiber is loaded into a tank for agitation, for example, by a centrifugal water pump, and then water is added to the tank based on 1 m$^3$ for 10 kg-15 kg of a fiber. After the process is terminated, the finished material is offloaded to a centrifuge using a wet-pit pump. To prevent product losses, a special mesh bag is mounted in the centrifuge. Centrifugal process runs preferably 7 minutes. The fiber in the mesh bag is then offloaded from the centrifuge. Then the fiber is dried. At all steps of conditioning, there is provided intense agitation of fibers due to which volume zones are created in the form of interlaced fiber sites.

The second stage is started with preparation of a fiber suspension. For this purpose, water is supplied to the tank and simultaneously preliminarily conditioned fibers are loaded. Water is used based on 1 m$^3$ of water for 100 kg-180 kg of loaded mixture. With intense agitation of the loaded mixture in the tank, a homogeneous suspension of a fiber in water is prepared in the tank. The obtained suspension is then pumped by the pump to a tank for mixture of components of the composite material, wherein granulated material is loaded into the tank with continuous agitation of the suspension. If the granulated material includes a combination of components, then loading of each granulated component is carried out sequentially. Suspension agitation is carried out by the centrifugal water pump at the rate of water 1 m/s-2 m/s for a duration of 1 min.-15 mins. After the agitation process is terminated, a prepared mixture is unloaded into a centrifuge to remove water from the mixture. To prevent losses of product and facilitate the unloading of the prepared mixture, a special container with a mesh bag is mounted in the centrifuge. Centrifugal process is carried out during a set time with a set rotational rate of the centrifugal drum, depending on contents of the sorption mixture. At all steps of obtaining the composite material, intense agitation of initial components continues, resulting in the promotion of formation of the composite structure, while at the same time a granulated material including the powdered activated carbon fills up the interlaced fiber sites preliminarily created at the first stage. A structure is formed with volume zones in the form of interlaced fiber sites filled with granulated material.

The composite material obtained in such a way is poured in a suitable absorption column, condensed, and packed.

IMPLEMENTATION OF THE INVENTION

Possibility of industrial applicability and achievement of liquid purification efficiency regarding such indicators as ions of lead and chloroform using the invention utilization are proved to be true by the following examples.

Example a (According to the Invention)

For preparation of filter columns on the basis of a composite material, the following components have been used: a cation-exchange fibers based on polyacrylonitrile "Aqualen 2" (produced by "Kemetsorb" Ltd., Russia) with average length 3.5 mm, surface energy 50 mJ/m$^2$; granulated activated carbon of 20×50 mesh, 250 micron-850 micron (produced by "PJAC", Philippines); powdered activated carbon of 50×200 mesh, 50 micron-250 micron (produced by "PJAC", Philippines); cation-exchange resin Lewatit CNP LF a grade 0.2 mm-0.6 mm (produced by LanXess, Germany). The composite material obtained in such a way has been packed into cylindrical sorption columns (polypropylene, diameter 60 mm, height 70 mm). Thus, 3 columns have been made: A1, A2, and A3 (Table 1). During filtration, the columns of example A have been installed vertically with liquid pumped through the columns from top to bottom.

Comparative Example B (According to a Prototype)

One part by weight of cut activated carbon "Aqualen" fibers (produced by "Kemetsorb" Ltd., Russia) with the average length 10 mm, surface energy 50 mJ/m² has been put in the container, and 100 parts by weight of water was added to make a suspension. Seven parts of granulated activated carbon F200 (Calgon, USA) with the average grade 20×50 mesh, 250 micron-850 micron, was added in a suspension and well mixed at room temperature. The created mixture was centrifuged to reduce water contents up to less than 40% by weight. The dehydrated mixture of adsorbents then was densely packed into a cylindrical filter column. In this way, there have been made 3 columns: B1, B2, and B3 (Table 1). During a filtration, the columns of example B have been installed vertically with liquid pumped through columns from top to bottom.

TABLE 1

Weight of components in a sorption cartridge, in grams (g).

| Component | A1 | A2 | A3 | B1 | B2 | B3 |
|---|---|---|---|---|---|---|
| Fiber "Aqualen 2" | 6 | 5 | 4 | — | — | — |
| Fiber "Aqualen" | — | — | — | 7 | 7 | 6 |
| Activated carbon 20 × 50 | 50 | 30 | 30 | 46 | 50 | 55 |
| Activated carbon 50 × 200 | — | 30 | 25 | — | — | — |
| cation-exchange resin Lewatit CNP LF | — | — | 15 | — | — | — |

In all cases, the gross volume of columns has been filled completely by the composite material.

Example 1

A standardized test solution of ions of lead with concentration of 0.15 mg/l has been passed through sorption columns A1, A2, A3, B1, B2, and B3 by gravity from a top reservoir. Filtration time was fixed and concentration of ions of lead in the filtered water was determined. Concentration of ions of lead in the filtered water was determined according to GOST 1829372 "Drinking water. Methods of determination of contents of lead, zinc, silver". Results are shown in Table 2.

Similarly, a standardized test solution of chloroform with concentration of 0.5 mg/l has been passed through sorption columns A1, A2, A3, B1, B2, and B3 by gravity from a top reservoir. Filtration time was fixed and concentration of chloroform in the filtered water was determined. Concentration of chloroform in the filtered water was determined according to MUK 4.1.646-96 "Methodical instructions on gas-chromatographic determination of halogen-containing substances in water". Results are shown in Table 2.

TABLE 2

Removal of ions of lead and removal of chloroform

| | Lead ions | | Chloroform | |
|---|---|---|---|---|
| Column | Concentration of ions of lead, mg/l | Filtration time, 1 liter, sec | Concentration of chloroform, mg/l | Filtration time 1 liter, sec |
| A1 | 0.009 (94.0%)* | 158 | 0.008 (98.4%)* | 136 |
| A2 | 0.003 (98.0%) | 131 | 0.003 (99.4%) | 128 |
| A3 | 0.008 (94.6%) | 118 | 0.005 (99.0%) | 130 |
| B1 | 0.020 (87.0%) | 190 | 0.044 (91.2%) | 189 |
| B2 | 0.018 (88.3%) | 179 | 0.032 (93.4%) | 199 |
| B3 | 0.014 (91.0%) | 185 | 0.033 (93.6%) | 183 |

*% of removed

Table 2 shows that time of filtration of 1 liter of a standardized test solution through a series of columns of example A is less than time of filtration of the same standardized test solution through a series of columns of example B, because of increased filtration rate. Further, unlike a prototype, wherein the filtering mixture does not allow to purify and achieve satisfactory figures concerning ions of lead and chloroform, the proposed composite material, as shown in Table 2, due to its structure, allows to reach effective purification regarding these parameters.

While the present invention has been described in connection with the embodiment being considered now as most practically favorable and preferable, it is necessary to understand that the present invention is not limited by the described embodiment, and on the contrary, it covers various modifications and variants which are within the limits of scope of the proposed set of claims.

The invention claimed is:
1. A composite material to purify a liquid, the composite material having a volume, the composite material comprising:
   a plurality of fibers interconnected by a first number of interconnections forming interlaced fiber sites that define a plurality of volume zones throughout the volume of the composite material, each of the plurality of the volume zones having a density;
   a plurality of individual fibers connecting the interlaced fiber sites of the volume zones at a second number of interconnections that define a plurality of structural zones throughout the volume of the composite material, each of the plurality of the structural zones having a density that is less than the density of the volume zones, the volume zones and the structural zones forming a matrix that fills the volume of the composite material; and
   granulated material distributed at locations within and between the interlaced fiber sites of the matrix, wherein in a first state of the matrix the composite material is capable of insertion into a filter column in which the structural zones enable the volume zones to move in relation to each other without stratification while the interlaced fiber sites hold the granulated material at the locations preventing movement and agglomeration of the granulated material from the locations of the matrix, and in a second state of the matrix the first number of interconnections and the second number of interconnections increase when the liquid flows inside and around the interlaced fiber sites of the composite material in the filter column strengthening the matrix and increasing the density of the volume zones that increases ability to hold the granulated material at the locations of the matrix and prevents compaction of the interlaced fiber sites.

2. The composite material according to claim 1, wherein a size of an interlaced fiber site of the interlaced fiber sites is greater than an average length of the individual fibers connecting the interlaced fiber sites.

3. The composite material according to claim 1, wherein the size of each interlaced fiber site of the interlaced fiber sites is not less than 1 mm.

4. The composite material according to claim 3, wherein the size of each interlaced fiber site of the interlaced fiber sites is from 5 mm to 8 mm.

5. The composite material according to claim 4, wherein the average length of the individual fibers is from 0.5 mm to 3.9 mm.

6. The composite material according to claim 3, wherein the size of each interlaced fiber site of the interlaced fiber sites is from 9 mm to 16 mm.

7. The composite material according to claim 6, wherein the average length of the individual fibers is from 4 mm to 15.5 mm.

8. The composite material according to claim 1, wherein the granulated material is selected from the group consisting of granulated activated carbon, powdered activated carbon, granulated ion-exchange resin, granulated inorganic oxide adsorbents, carbonates, silicates, and any combination thereof.

9. The composite material according to claim 1, wherein the plurality of fibers and the individual fibers comprise polymer fibers with a surface energy not less than 30 mJ/m$^2$.

10. The composite material according to claim 9, wherein the polymer fibers are selected from the group consisting of polyacrylonitrile, cellulose fibers, modified cellulose fibers, polyamide fibers, polyester fibers, carbon fibers, silicon comprising fibers, and any combination thereof.

11. The composite material according to claim 9, wherein the polymer fibers comprise ion-exchange polyacrylonitrile fibers.

12. The composite material according to claim 4, wherein the average length of the individual fibers is from 2.5 mm to 3.5 mm.

13. The composite material according to claim 6, wherein the average length of the individual fibers is from 7 mm to 8 mm.

14. The composite material according to claim 9, wherein the surface energy of the polymer fibers is not less than 60 mJ/m$^2$.

15. The composite material according to claim 11, wherein the ion-exchange polyacrylonitrile fibers comprise at least one of: cation-exchange polyacrylonitrile fibers, anion-exchange polyacrylonitrile fibers, or cation-exchange and anion-exchange polyacrylonitrile fibers.

16. The composite material according to claim 1, wherein the first state is a dry non-purification state.

17. The composite material according to claim 1, wherein the second state is a wet purification state.

* * * * *